United States Patent Office 3,133,950
Patented May 19, 1964

3,133,950
METHOD OF PREPARING AMINO ALKYL SULFATES
Roy A. Pizzarello, Mount Vernon, N.Y., Alfred F. Schneid, New Milford, N.J., and Paul Resnick, Brooklyn, N.Y., assignors to Interchemical Corporation, New York, N.Y., a corporation of Ohio
No Drawing. Filed Sept. 18, 1959, Ser. No. 840,809
7 Claims. (Cl. 260—458)

This invention relates to a method of preparing amino alkyl sulfates and more particularly, has as its object, an economic method of preparing these products in highest purity and in yields of 90 to 100% of theory.

The object is attained by a method comprising reacting a molar amount of an alkanol amine with an equimolar amount of sulfuric acid under agitation and in the presence of a small amount of a cationic surface active agent. The reaction is carried out in an inert volatile solvent that forms an azeotrope with water.

Amino alkyl sulfates have many uses. For instance the β-amino compounds are useful as intermediate in the preparation of the corresponding ethylenimine derivatives. That is, subsequent distillation of the sulfate with alkali removes the elements of sulfuric acid and give the cyclic imine.

A method of preparing β-hydroxy ethanolamine sulfate in 90–95% yield is known in the art. In this method as shown in Leighton, et al., "A Modification of Wenker's Method of Preparing Ethylenimine," J.A.C.S., 69, 1540, 1947; equimolar amounts of ethanolamine and sulfuric acid are separately diluted with half their weight of water and cooled. The amine is then added slowly to the acid with constant stirring. The mixture is then boiled under reduced pressure using a water aspirator attached to the flask. When the temperature of the liquid reaches 145°, only enough heat is applied to keep the solution boiling and when a definite turbidity appears, usually between 155 and 160°, heating is stopped until the temperature begins to fall. Quite suddenly crrystallization takes place, causing the temperature to rise sharply to about 185°. After cooling, the cake is softened with 95% ethanol, removed from the flask and ground with additional ethanol followed by filtering and drying.

The method of this invention represents a distinct advantage over the aforementioned method in that: high temperatures and vacuum for water removal are not required; it is not necessary to carry out the reaction under reduced pressure; recovery of the product from the flask is made easier, and additional steps are not necessary for purification if a pure product is desired.

In carrying out the method, we prefer to add the sulfuric acid to the alkanol amine in the inert aromatic solvent under agitation and at a temperature of about 25° C. This temperature and order of addition prevents sulfonation of the solvent. Then, we find it desirable to add a small amount of cationic surface active agent, heat the charge to reflux, e.g. at a temperature of about 100°–150° C., and distill the inert volatile solvent-water azeotrope. An appropriate apparatus as e.g. a Dean-Stark trap, that will permit the settling of the water distillate and the return of the supernatant solvent to the reactor is recommended. This affords a simple method of measuring the water evolved as well as making efficient use of the solvent.

In the aforementioned method, the cationic surface active agent can be added at any time prior to heating the charge to reflux.

Although there is a large number of inert solvents that form azeotropic mixtures with water and can be used in the method, we prefer to use toluene or xylene.

Essential to the method is the presence of a small amount of a cationic surface active agent. This agent includes a long hydrocarbon chain that terminates in a group capable of ionizing as a positive charge. Examples of cationic surface active agents known to the art are the higher alkylamines, long chain quaternary ammonium compounds, fatty acid diamine condensates, fatty acid carbamides. Such materials are available from numerous suppliers. Some specific tradename products are Triton K–60, Hyamine 2389, Ethyl Cetab, Aerosol 61, Amino O, Sapamine WL and Drustat H. With out the use of a cationic surface active agent the product of our method becomes a putty-like mass which builds up around the reaction vessel and agitator. By its addition, the product is obtained in an easily filterable white crystalline form, leaving the reaction vessel absolutely clean.

The following examples are intended to illustrate the invention but in no way intended to limit the scope thereof.

Example 1

In a 3 liter flask, 183.3 grams (3 moles) of monoethanolamine is dissolved in 1000 ml. of toluene. 307 grams (3 moles) of 95.0% sulfuric acid is then added to the solution with agitation while maintaining the temperature at about 25° C. Then, a solution of 4 grams of cetyl dimethylethyl ammonium bromide in 20 ml. of water is added and the charge heated to reflux. The water which is split out from the reaction is removed by azeotropic distillation; the solvent distillate returned to the flask, and the water drawn off in a Dean-Stark trap. When the theoretical amount of water has been recovered, the contents of the flask are cooled, filtered and dried. 420 grams of white, crystalline β-amino ethyl sulfate corresponding to the formula

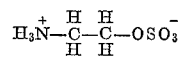

is obtained (99% of theory) and the inert aromatic solvent of the reaction recovered.

Example 2

874 grams (12 moles) of monoisopropanolamine is dissolved in 6 liters of toluene. 1191 grams (12 moles) of 97.1% H₂SO₄ is added to the solution with agitation while maintaining the temperature at about 25° C. Then a solution of 24 grams of cetyldimethylethyl ammonium bromide in 120 ml. of water is added and the charge heated to reflux. The water which is split out from the reaction is removed by azeotropic distillation, the solvent distillate returned to the flask, and the water drawn off in a Dean-Stark trap. When the theoretical amount of water has been removed, the contents of the flask are cooled, filtered, and dried. A 99% yield of the corresponding β-aminoalkyl sulfate of formula

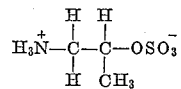

is obtained as a fluffy white powder and the inert aromatic reaction solvent recovered.

Example 3

980 grams (10 moles) of 100% H₂SO₄ is added to a mixture of 89.14 grams (10 moles) of 2-amino-2-methyl, propanol-1- and 6 liters of toluene with agitation while maintaining the temperature at 25° C. Then, a solution of 1 gram of lauryl pyridinium chloride in 35 ml. of water is added and the charge heated to reflux. The procedure for obtaining the sulfate is then the same as in Example 1. The yield of amine sulfate corresponding to the formula

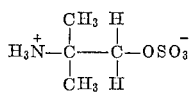

is 1641 grams of 97% of theory.

*Example 4*

The sulfate from 10 moles of 2-amino-butanol-1 is prepared using the same conditions as in Example 1. A yield of 1566 grams of sulfate corresponding to the formula

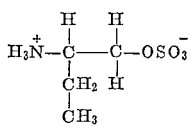

is obtained (92% of theory).

*Example 5*

392 grams (3.8 moles) of 96.4% $H_2SO_4$ is added to a charge of 356.6 grams (4 moles) of 3-aminobutanol-2 in 2400 ml. of toluene. Then 0.8 gram of lauryl pyridinium chloride is added and the charge heated to reflux. The procedure of obtaining the sulfate is then followed as in Example 1. 650 grams of sulfate corresponding to the formula

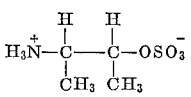

is obtained (96% of theory).

*Example 6*

The sulfate from 412 grams (4 moles) of 3-amino-3-methyl butanol-2 is prepared using the same conditions as in Example 1. 655 grams of sulfate corresponding to the formula

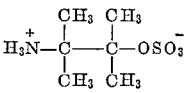

is obtained (96% of theory).

*Example 7*

The sulfate from 356 grams (4 moles) of N-ethyl ethanol-amine is prepared using the same conditions as in Example 1. 675 grams of sulfate corresponding to the formula

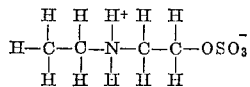

is obtained (100% of theory).

*Example 8*

The sulfate from 721 grams (9.6 moles) of N-methyl-ethanolamine is prepared using the same conditions as in Example 1. A 96% yield of sulfate corresponding to the formula

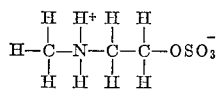

is obtained.

*Example 9*

1400 grams of toluene is charged to a three-neck flask, equipped with an agitator and a suitable condenser for the azeotropic distillation of water. 166 grams of monoethanolamine is then charged and the temperature cooled to 25° C.; 283 grams of 95% sulfuric acid (2.72 mole) is then added at such a rate that the temperature does not exceed 25° C. Then 0.5 gram of lauryl pyridinium chloride is added and the temperature raised to reflux (108° C.). The water is removed azeotropically and the toluene solvent returned to the reaction flask. When no more water is carried over (about 95% of theory), the flask is cooled to 50° C., and the product vacuum filtered and dried at 60° C. A theoretical yield of 384 grams or 100% of theory is obtained.

*Example 10*

The method is the same as in Example 9 except that .5 gram of cetyl dimethyl ethyl ammonium bromide is used in place of the lauryl pyridinium chloride. The yield and quality of the product are identical to Example 9.

*Example 11*

The method is the same as in Example 9 except that benzene is used as the solvent for the azeotropic distillation of water instead of toluene.

*Example 12*

The method is the same as in Example 9 except that xylene is used as the solvent.

*Example 13*

900 grams of toluene and 150 grams (2.0 moles) of isopropanolamine are charged to a suitable flask, equipped as in Example 9. The temperature is cooled below 20° C., and 212 grams (2.0 moles) of 96% of sulfuric acid added at such a rate that a temperature below 25° C. is maintained. Then, 0.5 gram of tetradecyl amine is added. The temperature is raised to reflux, the water azeotropically removed, and the toluene solvent returned to the flask. When the theoretical amount of water has been removed, or when a water distillate is no longer evident, the mass is cooled to 50° C. and filtered. Upon drying, a theoretical yield of 310 grams of pure white crystalline isopropanolamine sulfate is obtained.

*Example 14*

The method is the same as in Example 13, except that 0.5 gram of the acetate of tetradecylamine is used as the cationic surface active agent.

*Example 15*

The method is the same as in Example 13, except that 0.5 gram of stearamido isopropyl dimethyl b-hydroxy ethyl ammonium phosphate is used as the cationic surface active agent.

It is intended that the foregoing description be considered illustrative only and not in limitation of the invention.

We claim:

1. The method of preparing β-amino alkyl sulfates which comprises reacting a β-amino alkanol at reflux temperature in the presence of a minor amount of a cationic surface-active agent with an equimolar amount of sulfuric acid in an inert solvent that forms an azeotropic mixture with water selected from the group consisting of benzene, toluene, and xylene and removing the water of reaction by azeotropic distillation.

2. The method of preparing an amino alkyl sulfate from a β-amino alkanol selected from the class consisting of ethanolamine, isopropanolamine, 2-amino-butanol-1, 2-amino-2-methyl propanol-1, 3-amino-butanol-2, N-ethyl ethanolamine, N-methyl ethanolamine, and 3-amino-3-methyl butanol-2, comprising reacting a solution of the alkanolamine at reflux temperature in the presence of a minor amount of a cationic surface-active agent with an equimolecular amount of sulfuric acid in an inert solvent that forms an azeotropic mixture with water selected from the group consisting of benzene, toluene, and xylene and removing the water of reaction by azeotropic distillation.

3. The method of preparing β-amino ethyl sulfate comprising reacting at reflux temperature a toluene solution of ethanolamine with an equilmolar amount of sulfuric acid in the presence of a minor amount of a cationic surface active agent and removing the water of reaction by azeotropic distillation.

4. The method of preparing β-amino isopropyl sulfate comprising reacting at reflux temperature a toluene solution of isopropanol amine with an equimolar amount of sulfuric acid in the presence of a minor amount of a cationic surface active agent and removing the water of reaction by azeotropic distillation.

5. The method of preparing β-amino β-ethyl ethyl sulfate comprising reacting at reflux temperature a toluene solution of 2-amino-butanol-1 with an equimolar amount of sulfuric acid in the presence of a minor amount of a cationic surface active agent and removing the water of reaction by azeotropic distillation.

6. The method of preparing β-amino β-dimethyl ethyl sulfate comprising reacting at reflux temperature a toluene solution of 2-amino-2-methyl propanol-1 with an equimolar amount of sulfuric acid in the presence of a minor amount of a cationic surface active agent and removing the water of reaction by azeotropic distillation.

7. The method of preparing β-amino-α-methyl β-methyl ethyl sulfate comprising reacting at reflux temperature a toluene solution of 3-amino-butanol-2- with an equimolar amount of sulfuric acid in the presence of a minor amount of a cationic surface active agent and removing the water of reaction by azeotropic distillation.

References Cited in the file of this patent
FOREIGN PATENTS
581,539     Great Britain _____ Oct. 16, 1946
OTHER REFERENCES
Rollins et al.: J.A.C.S. 60, pages 2312–2314 (1938).